UNITED STATES PATENT OFFICE.

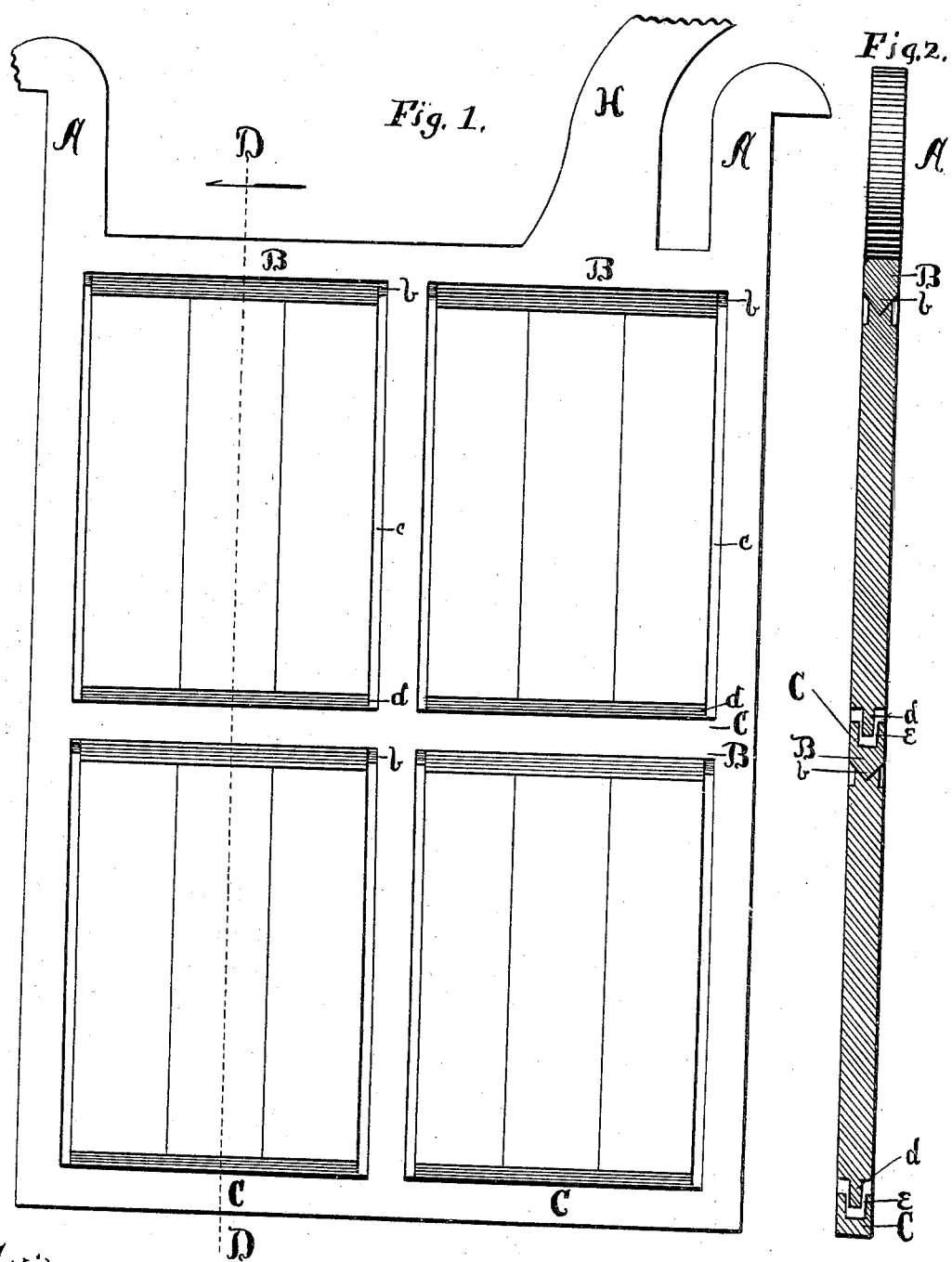

CHARLES S. KAUFMANN, OF CHICAGO, ILLINOIS, ASSIGNOR TO THE AMERICAN BATTERY COMPANY, OF CHICAGO, ILLINOIS.

PLATE-HOLDER FOR ELECTRIC STORAGE BATTERIES.

SPECIFICATION forming part of Letters Patent No. 684,643, dated October 15, 1901.

Application filed January 10, 1901. Serial No. 42,716. (No model.)

*To all whom it may concern:*

Be it known that I, CHARLES S. KAUFMANN, a citizen of the United States, residing at Chicago, Illinois, have invented certain new and useful Improvements in Plate-Holders for Electric Storage Batteries, of which the following is a specification.

The object of my invention is to make a plate holder or frame for use in electric storage batteries which shall be simple in construction and at the same time strong and efficient. In electric storage batteries it is desirable to employ a plate-holder which shall hold the plate firmly in place and at the same time allow for the growth or expansion of the plate, which occurs in continued use, especially when subjected to strains in charging and discharging at comparatively high rates of current covering a considerable period of time, in which case the plate expands very materially, and with the plate securely fastened at all points such growth or expansion would cause the plate to bulge or buckle, thus producing a short circuit by contact with adjacent plates. In order to accommodate a number of plates, I make my plate holder or frame with a plurality of openings, each of which is adapted to receive a plate, so that I can make use of a number of plates in the same holder. These openings are secured by dividing the holder into sections with partitions, making the openings of any desired size. By thus making the holder and using a plurality of plates in it if one of the plates be destroyed or injured by growth or expansion it may easily be removed and a new one inserted in its place, while if the frame were filled with a single plate of the size of the several plates a much greater loss would be incurred.

In the drawings, Figure 1 is a side elevation of a plate holder or frame embodying my invention containing four plate-openings and two partitions, one longitudinal and the other transverse; and Fig. 2 is a transverse section of my invention taken on line D looking in the direction of the arrow.

My improved plate-holder is provided with a terminal H for the purpose of conducting the current generated to the point desired and with two hangers A, which are intended to suspend the plate in position in use. The upper sides B of the plate-openings in the particular kind of holder or frame shown in the drawings are provided with beveled edges b, to which the plates are securely attached by welding or brazing or in other desired ways for the purpose of holding them firmly and securely in place. The lower sides C of the plate-openings are provided with grooves e, into which the lower ends of the plates are loosely received for the purpose of permitting the plates to expand in a downward direction as such expansion occurs in use. The plate-openings are constructed of a size sufficient to allow a space at the sides of the plates for the purpose of permitting them to freely expand sidewise without hindrance. The lower ends of the plates are preferably provided with a tongue d, fitted loosely into the slot in the lower sides of the plate-openings, but I do not desire to limit myself to this particular arrangement, as plates of other constructions can be used so long as the connection between the lower ends of the plates and the lower sides of the plate-openings are such as to hold the plates securely in place and at the same time permit them to freely expand or grow in a downward direction. By my arrangement the plates can be securely fastened to the plate-holder, rigidly at one part and loosely at the others, so as to prevent them from being loosened or shaken out, while at the same time furnishing ample space for the growth or expansion which takes place during protracted use. Of course I do not intend to limit myself to a plate-holder having any particular number of plate-openings or partitions or to plate-openings of any particular size, as the plate-holder may be varied in all these respects, not to mention others, without departing from the spirit of my invention.

What I regard as new, and desire to secure by Letters Patent, is—

1. A storage-battery plate-holder having within its body a plate-opening having on one side and within the plane of the two body-faces a receiving edge for the fixed attachment thereto of one end of the plate and having on the opposite side of the plate-opening and within the plane of the two body-faces a recessed engaging edge for receiving therein and retaining loosely in place within the plane of the two body-faces the opposite free end of the plate, substantially as described.

2. A storage-battery plate-holder having a plurality of plate-openings, one of the sides of each opening being beveled to rigidly secure the head of a plate and the opposite side grooved or recessed to receive and retain the lower end of the plate in place, substantially as described.

3. The combination of plates for electric storage batteries and a plate-holder having a plurality of plate-openings to receive the plates and hold them within the plane of the plate-holder, the upper sides of the openings being solid and having the heads of the plates rigidly secured thereto and the lower sides being provided with longitudinally-extending grooves receiving and retaining the lower ends of the plates loosely in place, substantially as described.

4. The combination of plates for electric storage batteries and a plate-holder having a plurality of plate-openings adapted to receive the plates, the openings being of sufficient size to allow the plates to expand laterally, the upper sides of the openings being solid and having the heads of the plates rigidly secured thereto and the lower sides being provided with longitudinally-extending grooves or recesses receiving and retaining the lower ends of the plates therein and preventing their lateral displacement, substantially as described.

CHAS. S. KAUFMANN.

Witnesses:
SAMUEL W. BANNING,
THOMAS B. McGREGOR.